(12) United States Patent
Cogley (10) Patent No.: US 10,736,309 B1
(45) Date of Patent: Aug. 11, 2020

(54) BED BUG DETECTOR SYSTEM

(71) Applicant: Thomas Paul Cogley, Pinellas Park, FL (US)

(72) Inventor: Thomas Paul Cogley, Pinellas Park, FL (US)

(*) Notice: Subject to any disclaimer, the term of this patent is extended or adjusted under 35 U.S.C. 154(b) by 0 days.

(21) Appl. No.: 16/698,785

(22) Filed: Nov. 27, 2019

Related U.S. Application Data (60) Provisional application No. 62/771,799, filed on Nov. 27, 2018, provisional application No. 62/775,414, filed on Dec. 5, 2018.

(51) Int. Cl.
| | | |
|---|---|---|
| *A01M 1/02* | (2006.01) | |
| *A01M 1/10* | (2006.01) | |
| *A01M 1/14* | (2006.01) | |
| *A01M 1/22* | (2006.01) | |
| *H04M 1/215* | (2006.01) | |
| *G08B 19/00* | (2006.01) | |
| *G08B 17/10* | (2006.01) | |

(Continued)

(52) U.S. Cl.
CPC .......... *A01M 1/026* (2013.01); *A01M 1/023* (2013.01); *A01M 1/04* (2013.01); *A01M 1/103* (2013.01); *A01M 1/145* (2013.01); *A01M 1/223* (2013.01); *G08B 17/10* (2013.01); *G08B 19/00* (2013.01); *H04M 1/215* (2013.01); *A01M 2200/011* (2013.01); *G01S 19/42* (2013.01); *H04M 2250/52* (2013.01)

(58) Field of Classification Search
CPC .......... A01M 1/00; A01M 1/10; A01M 1/14; A01M 1/145; A01M 1/22; A01M 1/223; A01M 5/04; A01M 5/06; A01M 5/08

USPC ....... 43/107, 112, 113, 114, 123, 132.1, 138, 43/139, 140
See application file for complete search history.

(56) References Cited

U.S. PATENT DOCUMENTS

| | | | | |
|---|---|---|---|---|
| 3,318,075 A | * | 5/1967 | Wilson | A47L 7/04 96/233 |
| 4,037,351 A | * | 7/1977 | Springer | A01M 1/02 43/112 |

(Continued)

FOREIGN PATENT DOCUMENTS

| | | | | |
|---|---|---|---|---|
| CN | 2146817 Y | * | 11/1993 | A01M 5/08 |
| FR | 2890287 A1 | * | 3/2007 | A01M 5/08 |

(Continued)

*Primary Examiner* — Magdalena Topolski
*Assistant Examiner* — Morgan T Barlow (57) ABSTRACT

A bed bug attracting assembly is positioned at an upper location. A bed bug killing assembly is positioned at an intermediate location beneath the attracting assembly. A base assembly is positioned at a lower location beneath the killing assembly for maximizing the number of bed bugs attracted and killed. A control assembly has a user visible digital UPC code, a battery power percentage indicator with an ON/OFF button and a sound activated switch, a cell phone with a macro-lens, and two light emitting diode positioned adjacent thereto to illuminate bed bugs. An electric grid triggers a camera detector. A $CO_2$ self-emitting device includes graphite and an electrical charge. A platform with pores holds a lure over a miniature fan. A programmable computer is preprogrammed to modulate attraction modalities. A GPS transmitter is activated to sent to receives to secure the area of infestation.

1 Claim, 6 Drawing Sheets

(51) Int. Cl.
*A01M 1/04* (2006.01)
*G01S 19/42* (2010.01)

(56) References Cited

U.S. PATENT DOCUMENTS

| | | | | |
|---|---|---|---|---|
| 4,694,604 | A * | 9/1987 | Mitchell | A01M 1/20 43/114 |
| 4,843,752 | A * | 7/1989 | Munemasa | A01M 17/00 43/140 |
| 4,904,464 | A * | 2/1990 | Albanese | A01N 25/04 424/45 |
| 4,968,487 | A * | 11/1990 | Yamamoto | A01M 1/2077 422/125 |
| 5,255,469 | A * | 10/1993 | Sukup | A01M 5/08 43/140 |
| 5,400,543 | A * | 3/1995 | Ideker, Jr. | A01M 1/06 134/21 |
| 5,755,382 | A * | 5/1998 | Skotinkov | A01B 51/026 180/411 |
| 5,924,164 | A * | 7/1999 | Lindsay, Jr. | A47L 5/38 15/314 |
| 6,050,025 | A * | 4/2000 | Wilbanks | A01M 1/023 43/112 |
| 6,055,766 | A * | 5/2000 | Nolen | A01M 1/023 43/112 |
| 6,134,826 | A * | 10/2000 | Mah | A01M 1/04 43/112 |
| 6,286,249 | B1 * | 9/2001 | Miller | A01M 1/02 43/113 |
| 6,459,955 | B1 * | 10/2002 | Bartsch | A47L 9/00 700/245 |
| 6,568,123 | B2 * | 5/2003 | Nelson | A01M 1/023 43/107 |
| 6,568,124 | B1 * | 5/2003 | Wilbanks | A01M 1/023 43/112 |
| 6,594,944 | B2 * | 7/2003 | Chura | A01M 1/10 43/112 |
| 6,665,979 | B1 * | 12/2003 | Hsu | A01M 1/223 43/107 |
| 6,883,201 | B2 * | 4/2005 | Jones | A47L 5/30 15/319 |
| 7,073,287 | B2 * | 7/2006 | Lau | A01M 1/02 43/107 |
| 7,234,268 | B2 * | 6/2007 | Welch | A01M 1/02 43/112 |
| 7,441,298 | B2 * | 10/2008 | Svendsen | A47L 5/30 15/49.1 |
| 8,109,036 | B1 * | 2/2012 | Wilbanks | A01M 1/023 43/112 |
| 9,910,158 | B2 * | 3/2018 | Rudow | G01S 19/04 |
| 10,021,869 | B1 * | 7/2018 | Cogley | A01M 1/223 |
| 10,021,871 | B1 * | 7/2018 | Cogley | A01M 1/145 |
| 10,091,980 | B1 * | 10/2018 | Cogley | A01M 1/023 |
| 10,091,981 | B1 * | 10/2018 | Cogley | A01M 1/223 |
| 2001/0047231 | A1 * | 11/2001 | Peless | G05D 1/0033 701/23 |
| 2003/0051391 | A1 * | 3/2003 | Jablin | A01M 1/023 43/139 |
| 2003/0060928 | A1 * | 3/2003 | Abramson | G05D 1/0219 700/245 |
| 2003/0074832 | A1 * | 4/2003 | Snell | A01M 1/2016 43/124 |
| 2003/0208951 | A1 * | 11/2003 | Bossler | A01M 1/06 43/107 |
| 2004/0031190 | A1 * | 2/2004 | Collins | A01M 1/2011 43/132.1 |
| 2004/0123512 | A1 * | 7/2004 | Spiro | A01M 1/08 43/139 |
| 2004/0128902 | A1 * | 7/2004 | Kollars, Jr. | A01M 1/22 43/107 |
| 2004/0160199 | A1 * | 8/2004 | Morgan | F21S 4/20 315/312 |
| 2004/0200130 | A1 * | 10/2004 | Klein | A01M 1/18 43/114 |
| 2004/0216364 | A1 * | 11/2004 | Gosselin | A01M 23/08 43/61 |
| 2004/0216367 | A1 * | 11/2004 | Klein | A01M 1/14 43/114 |
| 2004/0237382 | A1 * | 12/2004 | Durand | A01M 5/00 43/139 |
| 2005/0011110 | A1 * | 1/2005 | Lin | A01M 1/023 43/122 |
| 2005/0019361 | A1 * | 1/2005 | Durand | A01M 1/02 424/405 |
| 2005/0060926 | A1 * | 3/2005 | Lee | A01M 1/08 43/113 |
| 2005/0066570 | A1 * | 3/2005 | Mosher, II | A01M 1/06 43/139 |
| 2005/0274061 | A1 * | 12/2005 | Zhu | A01M 1/023 43/139 |
| 2006/0042155 | A1 * | 3/2006 | Nolen | A01M 1/223 43/112 |
| 2006/0080887 | A1 * | 4/2006 | Chen | A01M 1/08 43/113 |
| 2006/0086037 | A1 * | 4/2006 | Roberts | A01M 1/02 43/107 |
| 2006/0242888 | A1 * | 11/2006 | Bedoukian | A01M 1/06 43/107 |
| 2006/0254124 | A1 * | 11/2006 | DeYoreo | A01M 1/06 43/139 |
| 2006/0260183 | A1 * | 11/2006 | Hockaday | A01M 1/023 43/129 |
| 2007/0011940 | A1 * | 1/2007 | Chen | A01M 1/023 43/113 |
| 2007/0157508 | A1 * | 7/2007 | Chang | A01M 1/06 43/139 |
| 2008/0052079 | A1 * | 2/2008 | Ohguri | G10L 21/0208 704/258 |
| 2008/0093447 | A1 * | 4/2008 | Johnson | G06K 9/228 235/383 |
| 2008/0148624 | A1 * | 6/2008 | Borth | A01M 1/2011 43/131 |
| 2008/0168701 | A1 * | 7/2008 | Hu | A01M 1/04 43/107 |
| 2008/0285388 | A1 * | 11/2008 | Ohguri | G08C 23/02 367/198 |
| 2009/0002191 | A1 * | 1/2009 | Kitaura | H04N 21/482 340/12.26 |
| 2009/0313881 | A1 * | 12/2009 | Troutman | A01K 13/003 43/107 |
| 2010/0145417 | A1 * | 6/2010 | Kaufmann | A01M 1/2094 607/91 |
| 2010/0186285 | A1 * | 7/2010 | Schmitt | A01M 1/24 43/132.1 |
| 2010/0205767 | A1 * | 8/2010 | Lewis | A47L 7/00 15/339 |
| 2011/0056117 | A1 * | 3/2011 | Fritzboger | A01M 27/00 43/73 |
| 2011/0154719 | A1 * | 6/2011 | Carroll | A01M 5/06 43/136 |
| 2011/0283597 | A1 * | 11/2011 | Coventry | A01M 1/08 43/107 |
| 2011/0311603 | A1 * | 12/2011 | Lucas | A45C 13/02 424/411 |
| 2012/0137569 | A1 * | 6/2012 | Younts | A01M 1/026 43/139 |
| 2012/0246998 | A1 * | 10/2012 | Vasudeva | A61L 9/00 43/114 |
| 2013/0014429 | A1 * | 1/2013 | Meskouris | A01M 1/2094 43/139 |
| 2013/0101654 | A1 * | 4/2013 | Mathis | A01N 59/00 424/405 |
| 2013/0228199 | A1 * | 9/2013 | Hung | A47L 9/2852 134/18 |
| 2013/0269128 | A1 * | 10/2013 | Jimenez | A61C 17/3481 15/22.1 |
| 2013/0326829 | A1 * | 12/2013 | Wilson | B08B 1/02 15/104.8 |

(56) References Cited

U.S. PATENT DOCUMENTS

| | | | |
|---|---|---|---|
| 2013/0326933 A1* | 12/2013 | Jung | A01M 1/04 43/140 |
| 2014/0008087 A1* | 1/2014 | Brown | B23Q 41/00 173/1 |
| 2014/0013655 A1* | 1/2014 | Southard | A01M 1/22 43/139 |
| 2014/0049120 A1* | 2/2014 | Kohtz | G06F 3/016 307/117 |
| 2014/0084774 A1* | 3/2014 | Phillips | A01M 1/2011 312/352 |
| 2014/0130930 A1* | 5/2014 | Ragner | F16L 11/118 138/121 |
| 2014/0137462 A1* | 5/2014 | Rocha | A01M 1/08 43/113 |
| 2014/0165452 A1* | 6/2014 | Rocha | A01M 1/06 43/113 |
| 2014/0168412 A1* | 6/2014 | Shulman | H04N 7/18 348/89 |
| 2014/0171011 A1* | 6/2014 | Diamond | G06F 19/00 455/404.1 |
| 2014/0190071 A1* | 7/2014 | Mistretta | A01M 1/04 43/112 |
| 2014/0201939 A1* | 7/2014 | Pruitt | E06B 5/00 15/301 |
| 2014/0268742 A1* | 9/2014 | Feit | F21V 3/0625 362/235 |
| 2014/0300477 A1* | 10/2014 | Rich | H04M 11/00 340/573.2 |
| 2015/0082687 A1* | 3/2015 | Neff | A01M 1/12 43/111 |
| 2015/0125504 A1* | 5/2015 | Ward | A01N 25/34 424/411 |
| 2015/0264913 A1* | 9/2015 | Ganmor | A01M 5/02 43/139 |
| 2015/0293091 A1* | 10/2015 | Slusarewicz | G01N 33/56905 435/7.22 |
| 2015/0305320 A1* | 10/2015 | Hedman | A01M 19/00 43/132.1 |
| 2016/0066556 A1* | 3/2016 | Banfield | A01M 1/106 43/113 |
| 2016/0157496 A1* | 6/2016 | Nchekwube | A01N 25/006 424/84 |
| 2016/0183476 A1* | 6/2016 | Kabakov | A01M 7/0089 239/159 |
| 2016/0262367 A1* | 9/2016 | Sandford | A01M 1/023 |
| 2016/0377093 A1* | 12/2016 | Shigemoto | F04D 29/281 415/121.2 |
| 2017/0079258 A1* | 3/2017 | Patel | A01M 1/023 |
| 2017/0094960 A1* | 4/2017 | Sasaki | H02S 20/20 |
| 2017/0202199 A1* | 7/2017 | Patel | A01M 1/023 |
| 2017/0223943 A1* | 8/2017 | Park | A01N 61/00 |
| 2018/0070576 A1* | 3/2018 | Itano | A01N 53/00 |

FOREIGN PATENT DOCUMENTS

| | | | | |
|---|---|---|---|---|
| GB | 2224172 A | * | 4/1990 | A47L 9/2889 |
| JP | 2004261155 A | * | 9/2004 | A47L 9/2889 |
| JP | 2008129446 A | * | 6/2008 | |
| WO | WO-9713408 A1 | * | 4/1997 | A01M 5/08 |
| WO | WO-2009049057 A1 | * | 4/2009 | A47L 9/30 |
| WO | WO-2015145789 A1 | * | 10/2015 | A01M 1/023 |

* cited by examiner

BED BUG DETECTOR SYSTEM

RELATED APPLICATIONS

The present application is based upon Provisional Application No. 62/771,799 filed Nov. 27, 2018, and Provisional Application No. 62/775,414 filed Dec. 5, 2018, the priority of which is claimed and is an improvement over my prior patent issued Oct. 9, 2018 as U.S. patent Ser. No. 10/091,980 which is a continuation-in-part of application Ser. No. 14/731,884 filed Jun. 5, 2015, now U.S. Pat. No. 10,021,871 issued Jul. 17, 2018, the subject matter of which applications is incorporated herein by reference.

BACKGROUND OF THE INVENTION

Field of the Invention

The present invention relates to a bed bug detector system and more particularly pertains to attracting bed bugs and for killing the attracted bed bugs, the attracting and killing being done in a safe, ecological, convenient, and economical manner.

Description of the Prior Art

The use of insect eliminating devices of known designs and configurations is known in the prior art. More specifically, insect eliminating devices of known designs and configurations previously devised and utilized for the purpose of attracting and killing insects are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a bed bug detector that is used to attract bed bugs and kill the attracted bed bugs, the attracting and killing being done in a safe, ecological, convenient, and economical manner, In this respect, the bed bug detector according to the present invention substantially departs from the conventional concepts and designs of the prior art, and in doing so provides an apparatus primarily developed for the purpose of attracting bed bugs and for killing the attracted bed bugs, the attracting and killing being done in a safe, ecological, convenient, and economical manner.

Therefore, it can be appreciated that there exists a continuing need for a new and improved bed bug detector which can be used for attracting bed bugs and for killing the attracted bed bugs, the attracting and killing being done in a safe, ecological, convenient, and economical manner. In this regard, the present invention substantially fulfills this need.

SUMMARY OF THE INVENTION

In view of the disadvantages inherent in the insect eliminating devices of known designs and configurations now present in the prior art, the present invention provides an improved bed bug detector. As such, the general purpose of the present invention, which will be described subsequently in greater detail, is to provide a new and improved bed bug detector and method which has all the advantages of the prior art and none of the disadvantages.

To attain this, the present invention essentially comprises an improvement over my patent Ser. No. 10/091,980 issued Oct. 15, 2018 which is incorporated herein by reference. The improved bed bug detector is comprised of a plurality of components. Such components are individually configured and correlated with respect to each other so as to attain the desired objective.

From a broad viewpoint, the present invention is a bed bug detector system. An attracting assembly is positioned at an upper location to attract bed bugs. A killing assembly is positioned at an intermediate location beneath the attracting assembly to kill the attracted bed bugs. A base assembly is positioned at a lower location beneath the killing assembly. In this manner, the number of bed bugs attracted and killed is maximized. For the protection of the public, the base may be hollow except for the power sources or may be a duplex, the base positioned above a smoke and/or fire and/or carbon monoxide detector. In their broadest context the new features include an electric grid, a $CO_2$ self-emitting device, a platform, a programmable computer chip, and a GPS transmitter.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

It is therefore an object of the present invention to provide a new and improved bed bug detector system which has all of the advantages of the prior art insect eliminating devices of known designs and configurations and none of the disadvantages.

It is another object of the present invention to provide a new and improved bed bug detector system which can be easily and efficiently manufactured and marketed.

It is a further object of the present invention to provide a new and improved bed bug detector system which is of durable and reliable constructions.

An even further object of the present invention is to provide a new and improved bed bug detector system which is susceptible of a low cost of manufacture with regard to both materials and labor, and which accordingly, is then susceptible of low prices of sale to the consuming public, thereby making such bed bug detector system economically available to the buying public.

Lastly, it is another object of the present invention to provide a bed bug detector system which can be used for attracting bed bugs, for killing the attracted bed bugs, and for maximizing bed bugs attracted and killed, in a safe, ecological, convenient, and economical manner.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
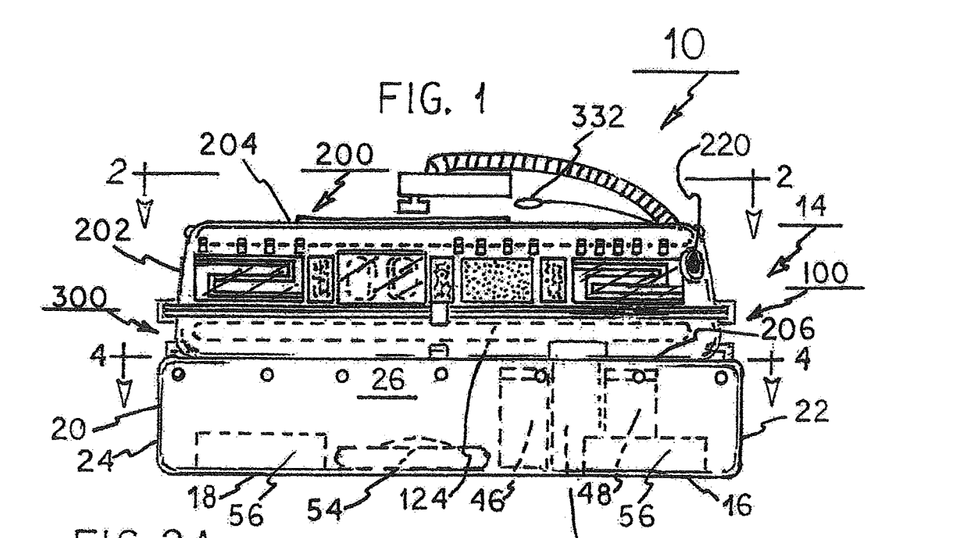
FIG. 1 is a right side elevational view of a bed bug detector system constructed in accordance with the principles of the present invention.
Figures 2, 2A:
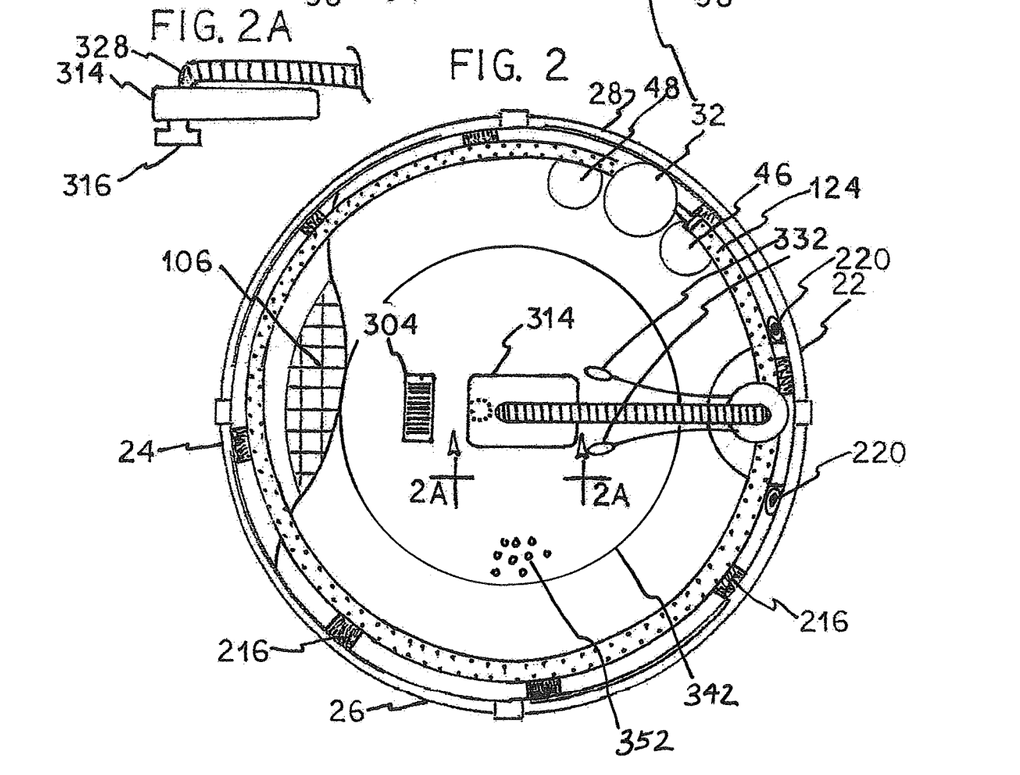
FIG. 2 is a plan view of the system taken along line 2-2 of FIG. 1.
FIG. 2A is a plan view of the system taken along line 2A-2A of FIG. 2.
Figure 3:
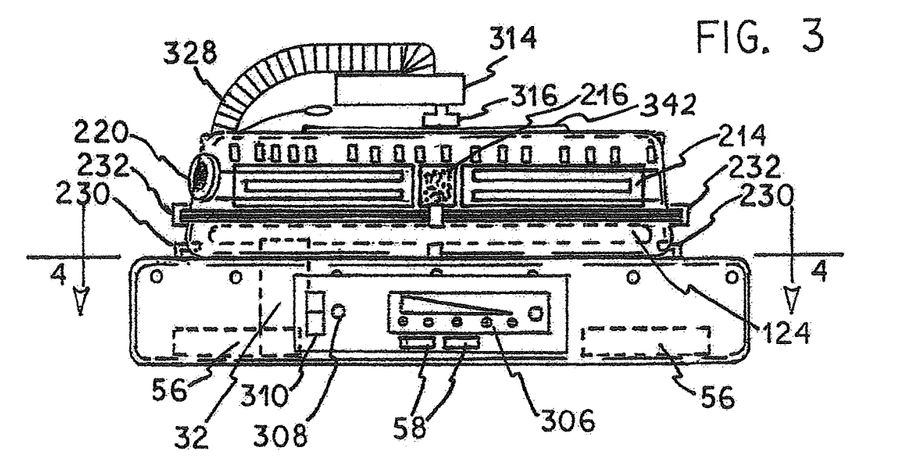
FIG. 3 is a left side elevational view of the system.
Figure 4:
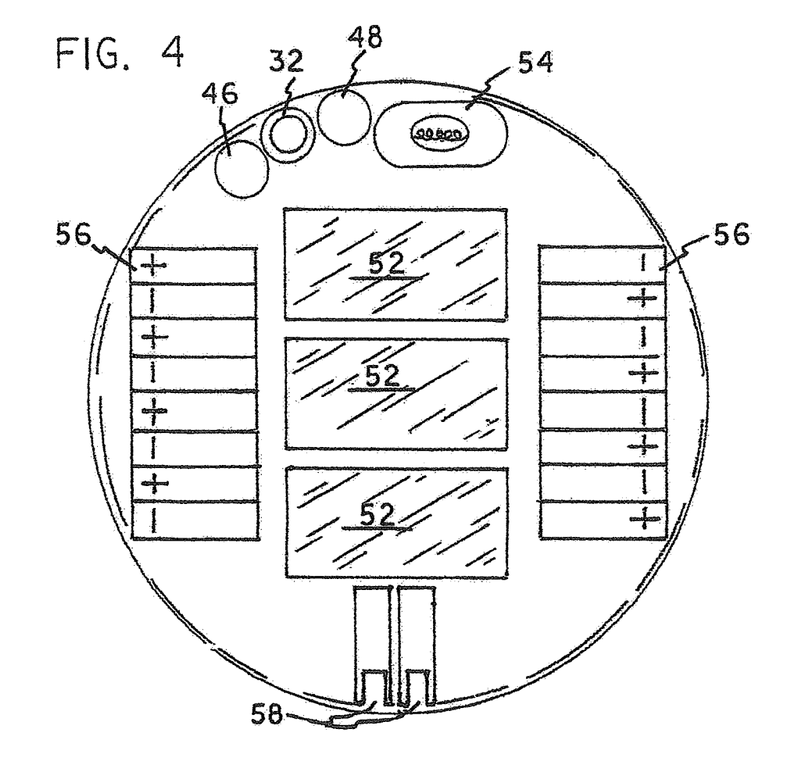
FIG. 4 is a plan view of the base assembly taken along line 4-4 of FIG. 1.
Figure 5:
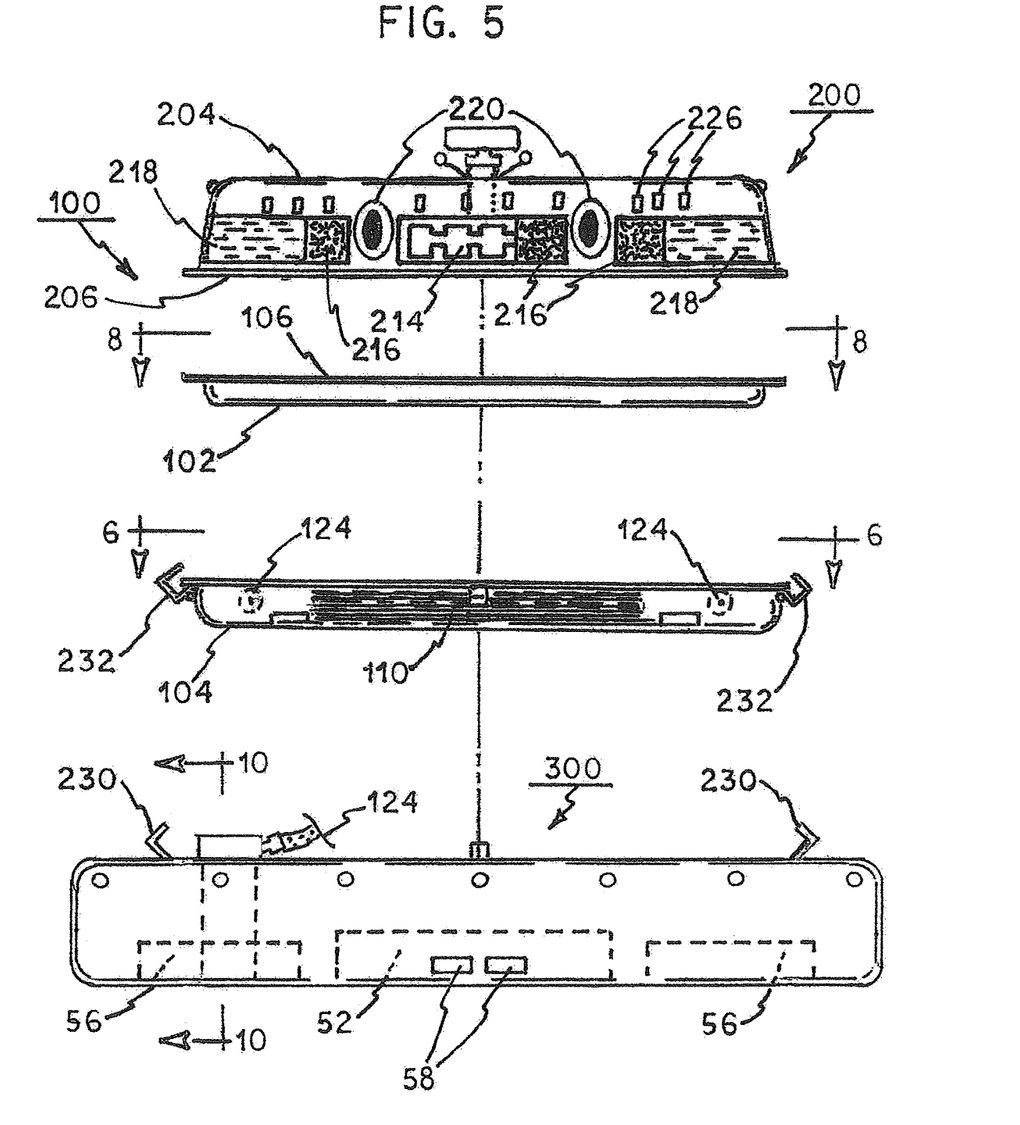
FIG. 5 is an exploded front elevational view of the system.
Figure 6:
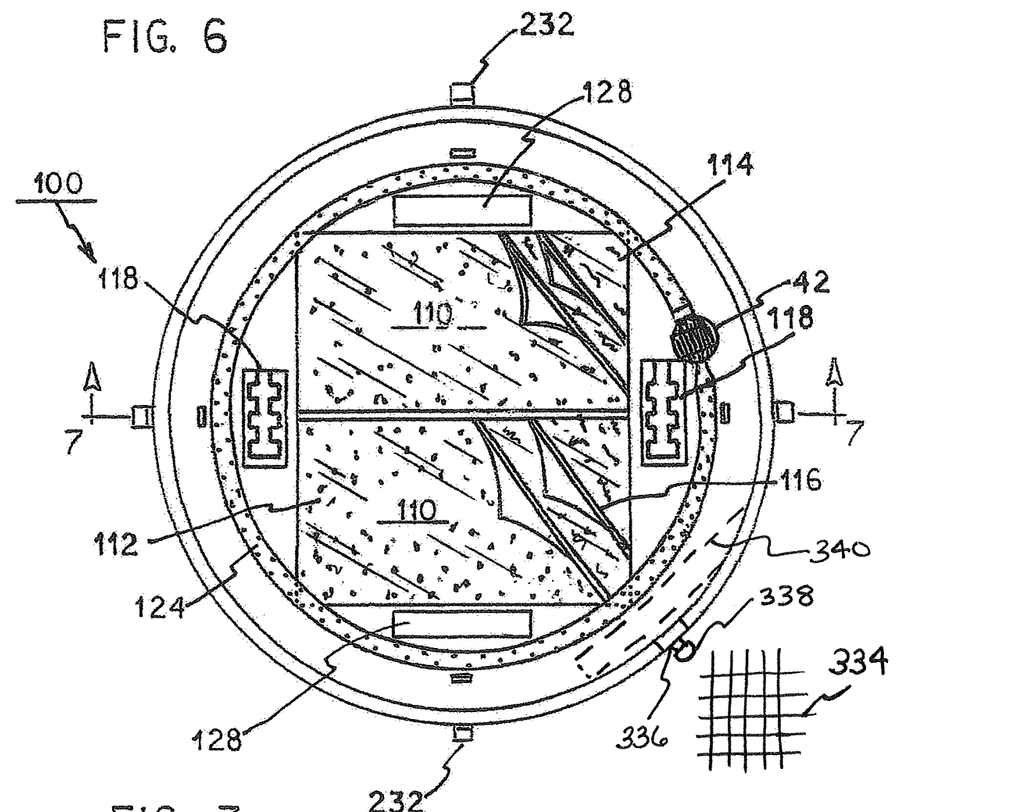
FIG. 6 is a plan view of the lower pan taken along line 6-6 of FIG. 5.
Figure 7:
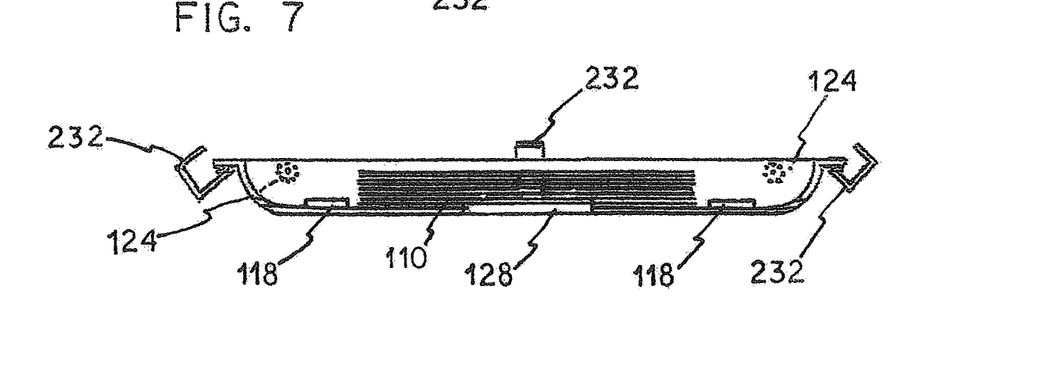
FIG. 7 is a cross sectional view taken along line 7-7 of FIG. 6.
Figure 8:
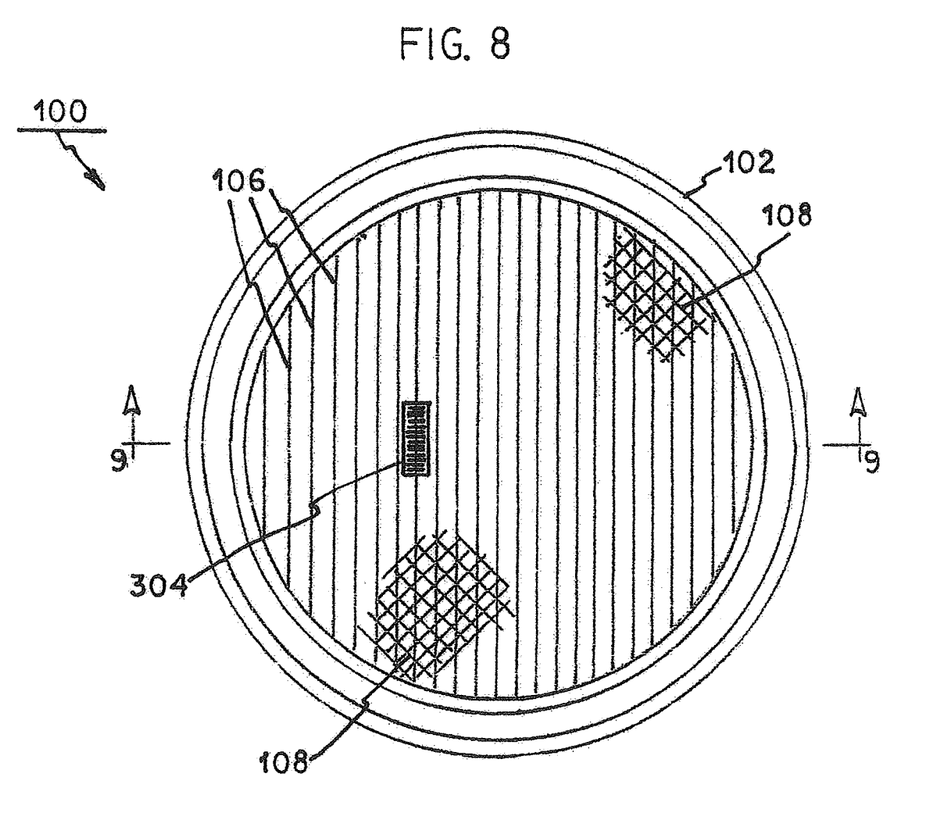
FIG. 8 is a plan view of the upper pan taken along line 8-8 of FIG. 5.
Figure 9:
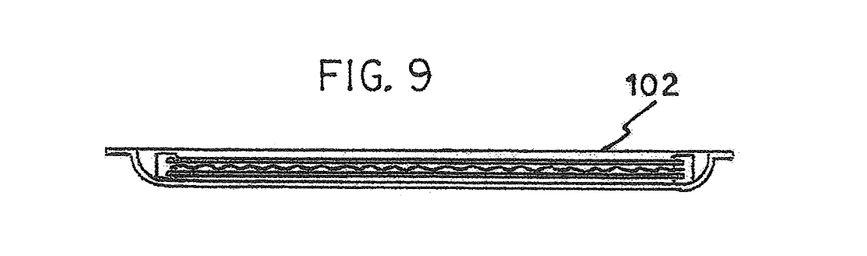
FIG. 9 is a cross sectional view taken along line 9-9 of FIG. 8.
Figure 10:
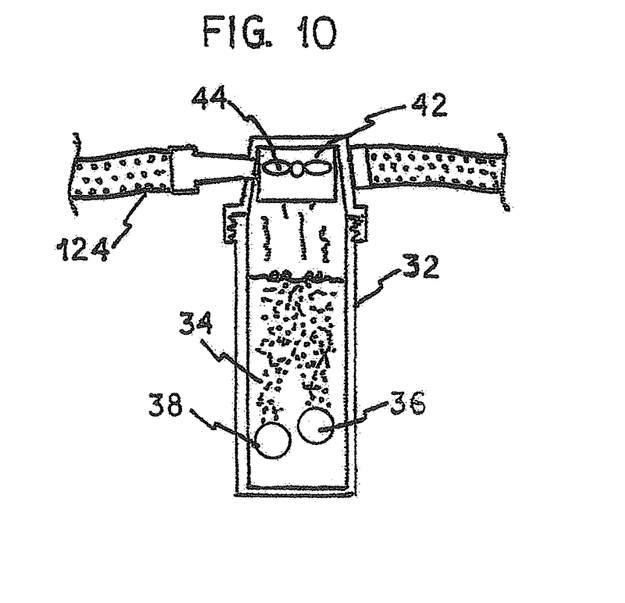
FIG. 10 is a cross sectional view of the fluid canister taken along line 10-10 of FIG. 5.
Figure 11:
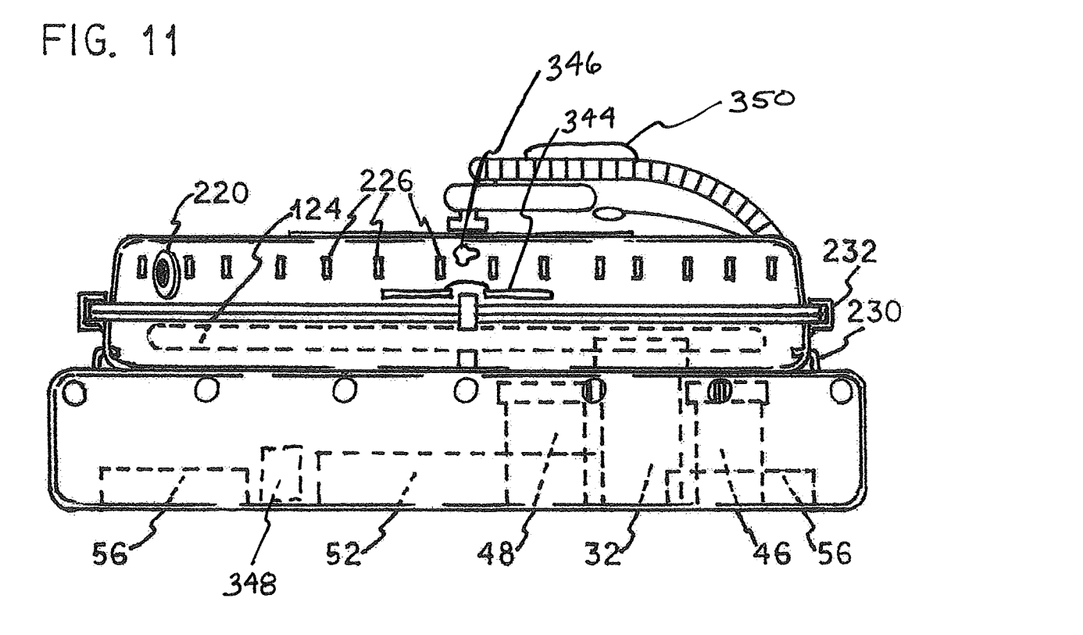
FIG. 11 is a side elevational view of the system, but with the cell phone removed.

With reference now to the drawings, and in particular to FIG. 1 thereof, the preferred embodiment of the new and improved bed bug detector system embodying the principles and concepts of the present invention and generally designated by the reference numeral 10 will be described.

The present invention, the bed bug detector system is comprised of a plurality of components. Such components in their broadest context include an attracting assembly, a killing assembly, and a base assembly, as in my prior issued patent. In their broadest context the new features include an electric grid, a $CO_2$ self-emitting device, a platform, a programmable computer chip, and a GPS transmitter.

From a specific viewpoint the present invention is the bed bug detector system of my prior patent with additional features. First provided is a base assembly 14. The base assembly has a base 16. The base has a circular floor 18 and a cylindrical side wall 20 and an open top forming a lower chamber. The base has a forward region 22, a rearward region 24, a left side region 26, and a right side region 28. The base assembly includes a fluid canister 32. The fluid canister contains water 34, a yeast pill 36, and a sugar pill 38 functioning to create carbon dioxide and to attract bed bugs. The pills are preferably in the shape of a bed bug to be attracted and killed. The base assembly includes a fluid motor 42 with a fluid fan 44 functioning to evacuate carbon dioxide from the fluid canister to attract bed bugs. A sugar jar 46 retains a supply of sugar tablets. A yeast jar 48 retains a supply of yeast tablets. For receiving and retaining bed bugs, three stacks of adhesive pads 52 are recessed on the floor of the base. Each stack includes alternating adhesive and adhesive sheets. The next component of the base assembly is a smoke/fire detector 54. For powering the components of the base assembly, the base assembly has two battery packs 56 within the lower chamber adjacent to the forward and rearward regions respectively. The battery packs are for powering the system including the smoke/fire defector and the motor of the base assembly and a recorded greeting. The base assembly includes charging ports. The charging ports function to recharge the battery pack.

A killing assembly 100 is next provided. The killing assembly includes an upper dish 102 and a lower dish 104. The upper dish has parallel electrically charged wires 106. The wires function to kill bed bugs coming into contact with the wires. The upper dish has a grid 108 of un-charged wires. The un-charged wires are spaced above the electrically charged wires. In this manner human contact with the electrically charged wires is abated. The killing assembly includes a plurality of adhesive sheets 110. The adhesive sheets are supported in two stacks 112, 114 laterally spaced in the lower dish to receive and retain bed bugs killed by the electrically charged wires. The electrically charged wires are optional. Each stack includes the adhesive sheets with adhesive sheets 116 between the adhesive sheets. A plurality of heating elements 118 are provided in the lower dish functioning to attract bed bugs. The killing assembly includes a tube 124 and olfactory patches 128 soaked in flea attracting pheromones. The tube is circular in configuration. The tube is secured within the attracting assembly. Apertures are provided along the length of the tube. The tube has a free end operatively coupled to the fluid canister for creating a cloud of carbon dioxide.

Next, an attracting assembly 200 is provided for attracting bed bugs to be killed. The attracting assembly has a frusto-conical side wall 202, an open top 204, and an open bottom 206. The attracting assembly includes peripheral components. The peripheral components are on the exterior surface of the attracting assembly. The peripheral components include heating elements 118, synthetic fur 116, adhesive patches 218, and indicia in the form of eye balls 220 creating the appearance of a creature. The eye balls are preferably made of fluorescent material for illumination to attract bed bugs. Square holes 226 are located peripherally through the attracting assembly to create a cloud around the system and in proximity thereto for attracting bed bugs to be killed. Lower clips 230 or magnets are provided on the base assembly. The clips or magnets couple the killing assembly to the base assembly. Upper clips 232 are provided on the killing assembly. The upper clips couple the attracting assembly to the killing assembly.

Next, a control assembly 300 is provided. The control assembly includes a user visible digital UPC, universal product code 304. The control assembly includes a battery power percentage indicator 306. The system has an ON/OFF button 310 and a CLAP ON/CLAP OFF switch 308 for a battery power percentage indicator.

Next provided is a cell phone 314 with a macro-lens 316 for wide angle photography with enlargements. A cable 328 supports the cell phone. Such cable is for cell phone support and repositioning purposes. Two light emitting diodes 332 are positioned adjacent to the macro-lens for illuminating the bed bug to be photographed. The positioning of the cell phone with its camera and the frusto-conical shape of the attracting assembly side wall, allows for the viewing of the side wall with attracted bed bugs.

The first additional feature provided in the preferred embodiment is an electric grid 334 designed to be safe and effective. The electrical grid has an alarm 336 built in. It is placed on the sides of the base 16 of the bed bug detector which triggers a camera detector system 338.

Next provided is a $CO_2$ self-emitting device 340. The device includes graphite and an electrical charge curved and otherwise shaped to fit into an arthropod/insect/tick attractant device.

Next, a platform 342 is provided in the center. The platform has pores 352 or orifices and holds a lure 346 over a miniature fan 344. This functions to promote distribution of the lure's smells.

A programmable computer chip 348 is provided next. The computer chip is pre-programmed for use. The computer chip is in line with the electronic portion of the device that will modulate the attraction modalities such as $CO_2$, heat, fans, etc. In the manner, resistance to these attractants by the bed bug is reduced. The variations cover a wide range of each attractants and overlap the other attractants ranges.

Next, a GPS transmitter 350 will be activated alongside of the camera and sent to receivers described above to secure the actual area of infestation of the pests. The IP address will also be sent and available where possible.

The bed bug detector in one form is circular with plural major elements, including those that are described above.

Provided next is a mechanism in the detector that sends out a pulse of carbon dioxide and/or air that by a number of physiological means startles, relaxes, and keeps the bed bug in place so a picture or video can be made without a blur and the insect can be identified over the wifi or other transmitter means to an outside receiver.

Lastly, the insect when captured in the detector will have its image and presence sent through the electromagnetic spectrum to a receiver at some distance. This may use a wifi component and/or set up such as: LAN, WAN, WLAN, MAN, SAN, PAN, EPN, and VPN and other means that may be used in the future for typical transmission.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bed bug detector system (10) configured for attracting bed bugs, for killing attracted bed bugs, and for maximizing bed bugs attracted and killed comprising, in combination:
   a base assembly (14) comprising:
      a base (16) comprising:
         a circular floor (18),
         a cylindrical side wall (20),
         an open top,
            the circular floor, cylindrical side wall and open top comprising a lower chamber,
         a forward region (22),
         a rearward region (24),
         a left side region (26), and
         a right side region (28);
      a fluid canister (32) containing water (34) and a yeast pill (36) and a sugar pill (38) functioning to create carbon dioxide and attract bed bugs;
      a motor (42) with a fluid fan (44) adapted to evacuate carbon dioxide from the fluid canister to attract bed bugs;
      a sugar jar (46) retaining a supply of sugar tablets;
      a yeast jar (48) retaining a supply of yeast;
      three stacks of adhesive pads (52) recessed on the circular floor of the base for receiving and retaining bed bugs, each stack including alternating adhesive and abhesive sheets;
      a smoke/fire detector (54);
      two battery packs (56) within the lower chamber, each battery pack being adjacent to the forward and rearward regions respectively for powering the components of the base assembly;
      charging ports adapted to recharge the battery pack;
   a killing assembly (100) structurally and operatively coupled to the base assembly comprising:
      an upper dish (102); and
      a lower dish (104),
      the upper dish comprising:
         parallel electrically charged wires (106) adapted to kill bed bugs coming into contact there with;
         a grid (108) of un-charged wires spaced above the electrically charged wires to abate human contact with the electrically charged wires;
      the lower dish comprising:
         a plurality of adhesive sheets (110) supported in two stacks (112), (114) laterally spaced in the lower dish to receive and retain bed bugs killed by the electrically charged wires, the two stacks each comprising the adhesive sheets with abhesive sheets (116) between the adhesive sheets,
         a plurality of heating elements (118) in the lower dish adapted to attract bed bugs,
      a tube (124) in a circular configuration secured within the killing assembly, the tube having apertures along the length the tube having a free end operatively coupled to the fluid canister for creating a cloud of carbon dioxide;
      olfactory patches (128) positioned within the base assembly soaked in pheromones to attract bed bugs to be killed;
   an attracting assembly (200) structurally and operatively coupled to the killing assembly and adapted to attract bed bugs to be killed comprising:
      a frusto-conical side wall (202) with an open top (204) and an open bottom (206);
      peripheral components on the exterior surface of the attracting assembly comprising:

heating elements (118),
synthetic fur (216),
adhesive patches (218),
indicia in the form of eye balls (220) providing an appearance of a creature to the system;
square holes (226) located peripherally through the attracting assembly to create a cloud around the system and in proximity thereto for attracting bed bugs to be killed;
lower clips (230) on the base assembly coupling the killing assembly to the base assembly;
upper clips (232) on the killing assembly to couple the attracting assembly to the killing assembly;
a plurality of olfactory patches (128) positioned within the base assembly and soaked in pheromones to attract bed bugs to be killed; and a control assembly (300) structurally and operatively coupled to the attracting assembly, the killing assembly, the base assembly, and a cell phone (314) comprising:
a user visible digital UPC code (304);
a battery power percentage indicator (306), the battery power percentage indicator comprising an ON/OFF button (310) and a hands free switch (308);
the cell phone (314) structurally and operatively coupled to the attracting assembly, the cell phone having a macro-lens (316) for wide angle photography with enlargements, the cell phone comprising:
a cable (328) for cell phone support and repositioning purposes; and
two light emitting diodes (332) positioned adjacent to the macro-lens for illuminating the bed bug to be photographed; and an electric grid (334) having a built-in alarm (336), the electric grid being on the side of the base of the bed bug detector to trigger a camera detector system (338);
a $CO_2$ self-emitting device (340), the $CO_2$ self-emitting device including graphite and an electrical charge curved and shaped and configured to fit into the attracting assembly;
a platform (342) in the center, the platform having pores (352), the platform holding a lure (346) over a miniature fan (344);
a programmable computer chip (348) pre-programmed for use, the computer chip being in line with the electronic portion of the device to modulate the attraction modalities including $CO_2$, heat, and fans, to reduce resistance to such attractants by the bed bug; and
a GPS transmitter (350) to be activated alongside the camera and sent to receivers to secure an area of infestation, the GPS transmitter adapted to send an IP address.

\* \* \* \* \*